(12) United States Patent
Starkey

(10) Patent No.: US 6,745,200 B2
(45) Date of Patent: Jun. 1, 2004

(54) FACILITY MANAGEMENT SERVICES DEFINING, SCHEDULING, EXECUTING SERIES OF TASKS PERFORMED BY SERVICE STAFF

(76) Inventor: Mary Starkey, 1201 William St., Apt. No. 2B, Denver, CO (US) 80218

( * ) Notice: Subject to any disclaimer, the term of this patent is extended or adjusted under 35 U.S.C. 154(b) by 0 days.

(21) Appl. No.: 10/216,993

(22) Filed: Aug. 12, 2002

(65) Prior Publication Data

US 2003/0083953 A1 May 1, 2003

Related U.S. Application Data

(62) Division of application No. 09/118,721, filed on Jul. 17, 1998, now abandoned.

(51) Int. Cl.[7] .............................................. G06F 17/30
(52) U.S. Cl. .............................. 707/102; 705/5; 705/9; 705/26; 705/27; 705/15
(58) Field of Search .............................. 707/100–104.1, 707/200–205, 501.1, 511–513; 709/203–210; 705/1–10, 5, 9, 26–27; 700/100–102; 439/79–80

(56) References Cited

U.S. PATENT DOCUMENTS

| | | | | |
|---|---|---|---|---|
| 5,111,391 A | * | 5/1992 | Fields et al. ................... | 705/9 |
| 5,581,461 A | * | 12/1996 | Coll et al. ...................... | 705/5 |
| 5,765,140 A | * | 6/1998 | Knudson et al. ............... | 705/9 |
| 5,835,898 A | * | 11/1998 | Borg et al. ..................... | 705/8 |
| 5,860,067 A | * | 1/1999 | Onda et al. .................... | 705/9 |
| 5,907,829 A | * | 5/1999 | Kida ............................... | 705/9 |
| 5,926,799 A | * | 7/1999 | Robinson ..................... | 705/28 |
| 5,970,466 A | * | 10/1999 | Detjen et al. .................. | 705/8 |
| 5,974,392 A | * | 10/1999 | Endo .............................. | 705/8 |
| 5,978,796 A | * | 11/1999 | Malloy et al. ................. | 707/3 |
| 5,983,195 A | * | 11/1999 | Fierro ........................... | 705/10 |
| 6,006,193 A | * | 12/1999 | Gibson et al. ................. | 705/8 |
| 6,049,776 A | * | 4/2000 | Donnelly et al. .............. | 705/8 |
| 6,446,030 B1 | * | 9/2002 | Hoffman et al. ............... | 703/1 |

OTHER PUBLICATIONS

FIS/FM Modules: Concept and Operations Facility Inventory Manager–FIM Version 3.1x, www.fisinc.com, pp 1–7, 93–98.*

* cited by examiner

Primary Examiner—Srirama Channavajjala
(74) Attorney, Agent, or Firm—Patton Boggs LLP

(57) ABSTRACT

The facility management system automatically generates information that is used to manage both a facility and the staff employed at the facility, with a high degree of integration and cross-correlation among the diverse attributes of the facility and services provided therein by the professional staff employed at the facility. The facility management system implements a multi-dimensional relational database to support the service delivery functions within a facility as well as the management of the physical plant that comprises the facility. The system identifies of all of the components of the facility, including structure architecture, components, contents and personal possessions of the residents and identifies all work that is to be done by the staff as well as by contractors. The work is defined in terms of Tasks that are linked to physical attributes of the facility as well as to staff to produce Task Sheets that are integrated coherent descriptions of Tasks that are assigned to Staff. The linking enables the efficient definition of Tasks in terms of physical locale, timeliness, elimination of redundancy of operation, minimization of work effort, thereby rendering the effecting of these Tasks economical. Each of the modules of the facility management system forges an information link with other information modules in the system to address the key issues of Who, What, Where, When to thereby enable the definition of the Tasks.

32 Claims, 12 Drawing Sheets

Zone 1
Front entry Hall, Front Powder Room, Front
Closets and Main Spiral Staircase
Living Room
Study
Dining Room Zone 2
Master Suite - Bedroom, Bathroom, Closet
Child's Bedroom-1, Bach & Closet
Child's Bedroom-2, Bath & Closet
Upper Hall and Stairway to Kitchen
Victorian & Oriental Guest Bedrooms Zone 3
Service Entry, Pantry
Kitchen & Breakfast Area
Conservatory
Powder Room Zone 4
Movie Room, Movie Room Bar & Bath
Video Library & Movie Control Cabinet, Game
Room, Bar and Basement Zone 5
Storage &Toy Rooms
Laundry areas, both upper and lower
Cleaning supplies room and bathroom
Wrapping paper room, attic Zone 6
Pool and pool area and changing room
Upper Pool House
 Exercise Area, Entertaining
 Area, Bar & Spiral Staircase
Lower Pool House
 Wine Cellar, Locker Room &
 Bath, Large sitting Area, Spa,
 Massage Room,? Sauna, Steam
 Room & Shower, Jet Pool Area Zone 7
Garage
Front grounds and gate area
Back gardens
Tennis court

FIG. 4

| Item | | | |
|---|---|---|---|
| Category (5a) | | Value/Cost | |
| Use/Function | | Quantity | |
| Date Acquired | Dimensions W H L | | |
| Material Composition | | | |
| Blueprint ID | External Reference | Insured    Y    N | |
| Off Site    Y    N | Date Out | Exp. Return Date | |
| Where Loaned | | | |

Family Information

| | |
|---|---|
| Mother | |
| Employer | |
| Secretary/Assistant | |
| Address | |
| Work Phone | Mobil Phone |
| Work Schedule: Monday Tuesday Wednesday | Thursday Friday |
| Chronic Health Conditions | |
| Allergies | |
| Medications | |
| Blood Type | |
| Height: | Weight: |
| Hair Color: | Eye Color: |
| Primary Physician | |
| Address | |
| Phone | Answering Service |
| Additional Treating Physicians | |
| Special Medical Needs | |
| Insurance Company | |
| Address | |
| I.D. Number | Phone |

FIG. 7

| Favorites For : ☆ | | |
|---|---|---|
| *Item* | *Description* | *When Most Appreciated* |
| Allergies - Food | | |
| Allergies - Other | | |
| Animals | | |
| Artist | | |
| Birthday | | |
| Book | | |
| Car | | |
| China | | |
| Clothes | | |
| Color | | |
| Designer - Ladies | | |
| Designer - Men | | |
| Beverage - alcohol | | |
| Beverage - Soft | | |
| Beverage - hot | | |
| Entertainment | | |
| Fabric | | |
| Flower | | |
| Foods - Breakfast | | |
| Foods - Lunch | | |
| Foods - Dinner | | |
| Foods - Snack | | |
| Foods - Comfort | | |
| Foods - seasonings | | |
| Foods - Dislike | | |

FIG. 8A

| Favorites For: ☆ | | (cont.) |
|---|---|---|
| Friends | | |
| Hobby | | |
| Jewelry Style | | |
| Linen | | |
| Magazine | | |
| Movie Style | | |
| Movie Name | | |
| Music | | |
| Party Style | | |
| Perfume | | |
| Personal Space | | |
| Philosopher | | |
| Physical Limits | | |
| Plant | | |
| Quiet Time | | |
| Reading | | |
| Relaxing activity | | |
| Season of the Year | | |
| Shirt | | |
| Silver | | |
| Sport | | |
| Time of Day | | |
| TV Show | | |
| Vacation | | |
| Vehicle | | |
| Wine | | |
| Writer | | |

FIG. 8B

| Daily Graces - Morning ||||
|---|---|---|---|
| *Time* | *All Zones* || *Completed* |
| 8 am - 10 am or as needed | Daily Graces typically include: <br> Dishes, dishwasher  Wash dishes use dishwasher if appropriate (Remember: crystal, fine china, silver, cutlery, hand painted bowls or serving platters & pots and pans <u>do not</u> go in the dishwasher.) <br><br> <u>Kitchen</u> <br> Clean counter tops, clean sinks, move items on the countertop and clean under them. Clean smudges and finger prints from cabinets, doors light switches, clean microwave oven, clean and shine inside and out. Clean refrigerators <br><br> <u>Kitchen Appliances</u> <br> Shine toaster, coffee maker, bread maker. (Note: appliances not left out should be cleaned before putting away.) <br><br> <u>Sink</u>   Remove lime deposits, clean & shine <br><br> <u>Furniture in kitchen</u>   Clean, dust, shine tables chairs etc. <br><br> <u>Garbage</u> <br> Empty trash compactor, put in new bag, wipe off <br><br> <u>Floors</u> <br> Remove chairs and small items, sweep well, including pantry. Clean well, Mop with warm water & all purpose ammonia <br><br> <u>Bedrooms</u> <br> Make all beds, neaten and fold throws, clean all mirrors. Look for streaks <br><br> <u>Glass</u>   Clean glass doors, tables as needed <br><br> <u>Vacuum</u> <br> heavy traffic areas as needed, comb tassels on carpets <br><br> <u>Waste container</u> <br> Empty, replace with new bag when necessary <br><br> <u>Bath</u> <br> Shine faucets, toilet paper holder, make-up mirrors, towel rack, toothbrush holder, Clean & refill vanity items, check for tissue and toilet paper, wipe bath, sink mirror, place fresh towels. <br><br> <u>Clocks</u>   check time <br><br> <u>Maintenance</u>   change light bulbs as needed, note any drips or squeaky hinges <br><br> <u>Phones</u>   clean with disinfectant <br><br> <u>Fireplaces</u>  remove any ashes, lay fireplace logs as needed |||

FIG. 9

| Daily Graces-Evening |||
|---|---|---|
| Evening Graces ||||
| Evening Graces are the tasks that need to be done at the close of each work day by the Household Manager or the Executive Housekeeper. These tasks are a final check to make sure that everything is in order and nothing has been overlooked by the staff and before the family arrives home. It is also the time that you ready things for the next day. |||

| *Time* | *All Zones* | *Completed* |
|---|---|---|
| 5 am - 6 pm | Evening Prep<br>Bring in mail, trash cans, wash cleaning rags in upstairs laundry, prep for dinner, see that kitchen is ordered, make sure all cleaning products & supplies are properly put away, check area refrigerators for staples, replace remote controls and generally reset the room to working order, set evening table per agreed upon choice of place mats/linens and service, check silver, china and crystal for spots and finger prints, greet family arriving home from busy day | |
| Timing varies with house and time of year (winter vs. summer) | Close House<br>Walk through of entire property and home (generally done at sundown), observing cleaning and projects completed during day. Pickup and order any clutter as needed, check items throughout the house, close curtains & blinds, walk, feed pets, fresh water, lock doors, windows, check dishwasher (unload or run if necessary) make sure garage doors are closed, turn down beds, re-check baths, place carafes of water beside each bed as requested, check for maintenance needs, change light bulbs as needed. | |

FIG. 10

| | Weekly Cleaning |  |
|---|---|---|
| \multicolumn{3}{l}{The following is a list of duties to be performed once a week for each zone. Time is allotted in each zone to accomplish these tasks. Duties are rotated to cover many tasks. A weekly or monthly cleaning does not negate the need for daily graces to be performed in a particular zone. When cleaning always enter a room and begin cleaning front the top down and front the furthest area from the door working your way out. To manage time well, separate wet work from dry work and vacuum last. In well ordered homes, clutter is dealt with by having a place for everything and everything in its place! Never slide or pick anything up without checking it for stability and when leaving a room, turn to check it after you complete it. This is a hard and fast rule for conscious service providers.} | | |

| Days/Time | Zones Two | Completed |
|---|---|---|
| | Clutter Put away in proper place | |
| | Walls Remove finger prints from walls, light switches, and door jambs | |
| | Baseboards wipe and clean | |
| | Furniture Dust: tables (top & legs). dressers shelves (sides, too), headboards, lamps, pictures, window ledges, TV etc. | |
| | Beds change bed linen, turn mattresses monthly | |
| | Carpet Vacuum. Be sure you get behind doors, the stairs, and under small furniture, spot clean as needed | |
| | Bathtub Clean tile and glass doors, then fixtures, soap dish, and tub. For mold use mildew remover. | |
| | Toilet Clean bowl, seat, lid, base, tank top. Check for toilet paper and tissues and replace. | |
| | Soap dish Remove soap build up, replace with new bar as needed. | |
| | Shower Curtain Straighten shower curtain and towels, wash monthly. | |
| | Floors Sweep thoroughly then mop, wipe floor moldings | |
| | Towels Change twice a week, clean towel rack | |
| | Plants Water, dust leaves as needed, remove dead leaves and flowers | |
| | Inventory Health & beauty items, refill vitamins, restock shampoos and conditioners | |

FIG. 11

Monthly Cleaning

A list of duties to be completed on a monthly basis. In a week's time each zone will be deep cleaned in accordance with this schedule. Good time management dictates that wet work is separated from dry work, that you begin cleaning from the top down and from the back of the room working your way out the door. Always vacuum last.

Monthly Checklist

| Day/Time | Week 1 Projects | Completed |
|---|---|---|
| | Clean windows - wash the insides, clean sills | |
| | Clean blinds | |
| | Vacuum windows treatments | |
| | Clean light fixtures, crystal ones by hand | |
| | Clean ceilings, walls, doors, baseboards and air vents | |
| | Clean ceiling fans | |
| | Clean/vacuum air conditioners & humidifiers | |
| Day/Time | Week 2 Projects | Completed |
| | Clean and organize closets, bathrooms, bedrooms | |
| | Clean drawers and shelves bathrooms, bedrooms | |
| | Re-order utility closets & restock | |
| | Re-fold linen closets and order as needed | |
| | Re-order and alphabetize tapes and disks | |
| | Wipe books | |
| | Discard old magazines | |
| | Polish wood furniture | |
| | Clean bed frames, vacuum under beds and bedroom furniture | |
| | Wash bath mats and dog rugs as needed | |
| Day/Time | Week 3 Projects | Completed |
| | Shine plants | |
| | Polish brass door plates and jams | |
| | Polish brass tables, beds and art objects | |
| | Clean fireplace and marble | |
| | Clean and polish all silver | |
| | Clean and organize china and crystal | |

| Day/Time | Week 3 Projects | Completed |
|---|---|---|
| | Clean kitchen rug &kids bath rug | |
| | Clean all refrigerators and freezers | |
| | Clean pots & pans above stove in kitchen | |
| | Clean kitchen cabinets inside and out | |
| | Clean and organize kitchen bar drawers & cabinets | |
| | Clean supply shelf and check supplies | |
| | Clean chairs, chair legs, table legs & beneath chairs and tables | |
| | Clean ice machine | |

FIG. 12

FACILITY MANAGEMENT SERVICES DEFINING, SCHEDULING, EXECUTING SERIES OF TASKS PERFORMED BY SERVICE STAFF

CROSS REFERENCE TO RELATED APPLICATIONS

This application is a divisional of U.S. patent application Ser. No. 09/118,721 filed on Jul. 17, 1998 and titled "Facility Management System" now abandoned.

FIELD OF THE INVENTION

This invention relates to systems for the automated generation of information that is used to manage both a facility and the services that are provided by the staff employed at the facility, with a high degree of integration and cross-correlation among the diverse attributes of the facility, the professional staff employed at the facility staff and the services provided therein by the staff.

Problem

It is a problem in the operation of a facility to efficiently manage the physical plant of the facility and also obtain the most efficient use of the staff that is employed at the facility. There are numerous computer programs that address segments of this problem and provide narrowly focused solutions to particularly common problems. Examples of such programs are the class of household budget/accounting programs that function to replicate the user's checkbook and provide a report generation capability based upon the checkbook data to thereby enable the user to track expenses and implement a household budget. There are also inventory programs that enable a user to document the contents and physical plant, specifics of a particular household. There are also employee management programs that enable the user to input employee data and implement the payroll and performance review functions.

However, each of these programs addresses only a single focused aspect of the management of a facility or its staff. There are significant voids in the field of facility and services management that are not addressed by any program. In addition, most of these programs are directed to an individual household of family members, with the program being run by one of the family members. This field is therefore devoid of a system that can provide the automated generation of information that is used to manage both a facility and the services that are provided by the staff employed at the facility, with a high degree of integration and cross-correlation among the diverse attributes of the facility and services provided therein by the professional staff employed at the facility. This is especially problematic in the field of professional services, such as the operation of managed care facilities, estate household management, and the like.

Solution

The above-described problems are solved and a technical advance achieved by the present system (termed "facility management system" herein) for the automated generation of information that is used to manage both a facility and the staff employed at the facility, with a high degree of integration and cross-correlation among the diverse attributes of the facility and services provided therein by the professional staff employed at the facility. The present facility management system implements a multi-dimensional relational database to support the service delivery functions within a facility as well as the management of the physical plant that comprises the facility. The preferred embodiment described herein is that of estate household management, wherein a professional staff is provided to operate an estate facility for a set of owners who may or may not reside full-time in the facility. The facility management system provides the capability to measure service expectations in both time and execution details while setting up the service delivery by means of the database capability contained therein.

One module of the facility management system provides for the identification of all of the components of the facility, including structure location, architecture, components, contents and personal possessions of the residents. This capability is termed "Household Inventory Module." Another module comprises the People Module that provides the identification of all of the people who are associated with the facility, including residents, guests, visitors, staff, contractors and the like. This component enables the entry of individual-specific data that provides an in-depth definition of the individual, their characteristics that are relevant to the facility management and the provision of the services. The facility management system uses these modules, as well as others, to identify all work that is to be done by the staff as well as by contractors. The work is defined in terms of Tasks that are linked to physical attributes of the facility as well as to staff to produce Task Sheets that are integrated coherent descriptions of Tasks that are assigned to Staff. The linking enables the efficient definition of Tasks in terms of physical locale, timeliness, elimination of redundancy of operation, minimization of work effort, thereby rendering the effecting of these Tasks economical. Each of the modules of the present facility management system forges an information link with other information modules in the system and the data contained therein to address the key issues of Who, What, Where, When to thereby enable the definition of the Tasks.

The provision of personal service in an estate management environment is an art form that far transcends the ordinary definition of "housekeeping" as it is commonly used. In particular, this requires a service relationship between the Household Manager and the principals of the family. The service relationship comprises a high level of communication and understanding of the intimate personal needs of the residents and guests to enable the Household Manager to provide the organization, technical knowledge, professionalism and discretion to the provision of the desired services.

BRIEF DESCRIPTION OF THE DRAWINGS

FIG. 4 illustrates in block diagram form an example of on level of the hierarchical database of the present facility management system as embodied in the definition of the zones of the facility;

FIG. 7 illustrates a portion of the data entry displays of the present facility management system that defines a particular resident of the facility;

FIGS. 8A, 8B illustrate a portion of the data entry displays of the present facility management system that defines the preferences of a particular resident of the facility;

FIGS. 9–12 illustrate typical output reports that can be produced by the present facility management system.

DETAILED DESCRIPTION

Figure 1:
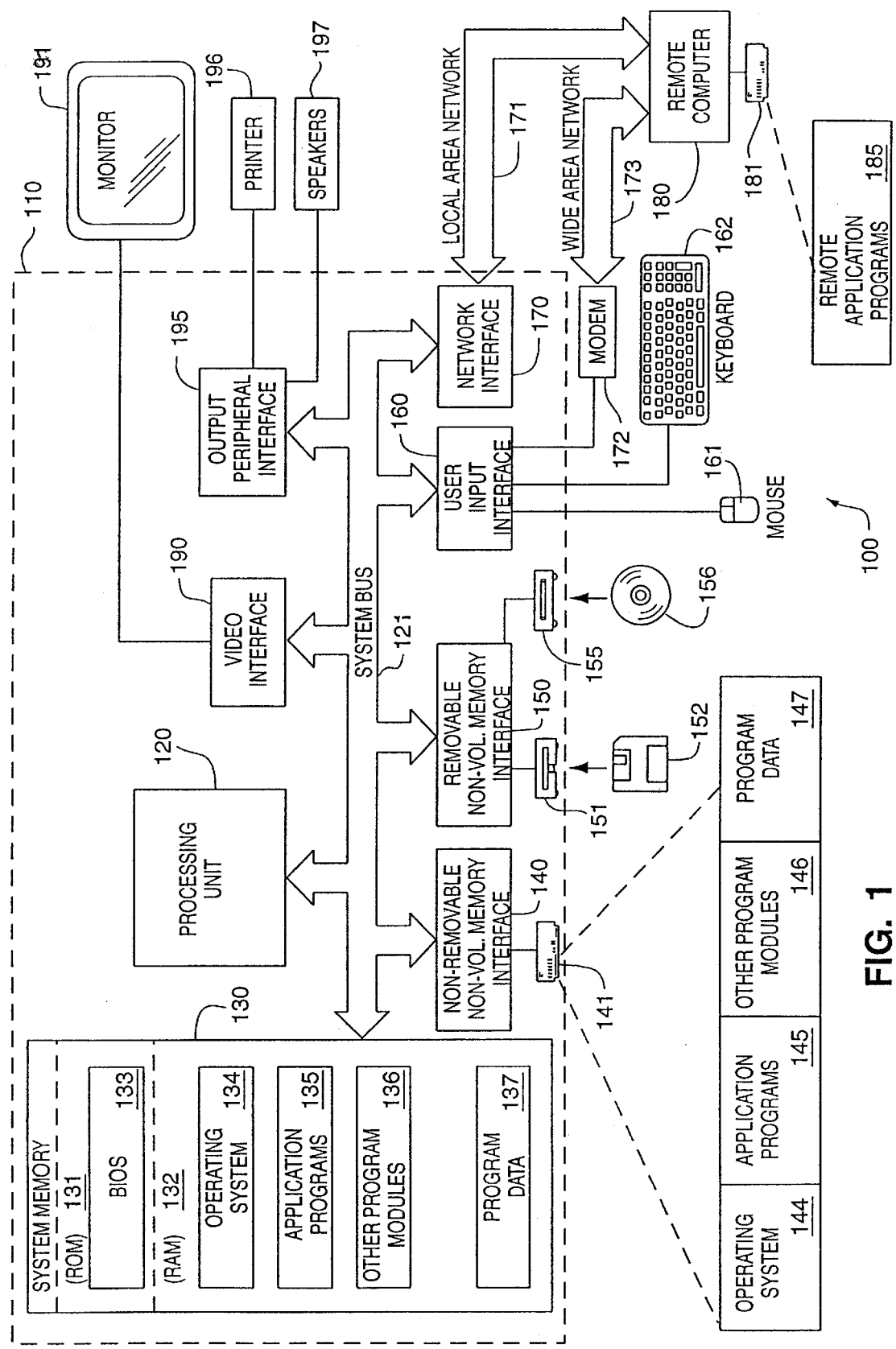
FIG. 1 illustrates in block diagram form the basic architecture of a typical computer system that is used to implement the present facility management system.

FIG. 1 illustrates in block diagram form the basic architecture of a typical computer system that is used to implement the present facility management system. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multi-processor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120.

Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridge, random access memories (RAMs), read only memories (ROM), and the like, may also be used in the exemplary operating environment. A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers. The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Architecture of the Facilities Management System

Figure 2:
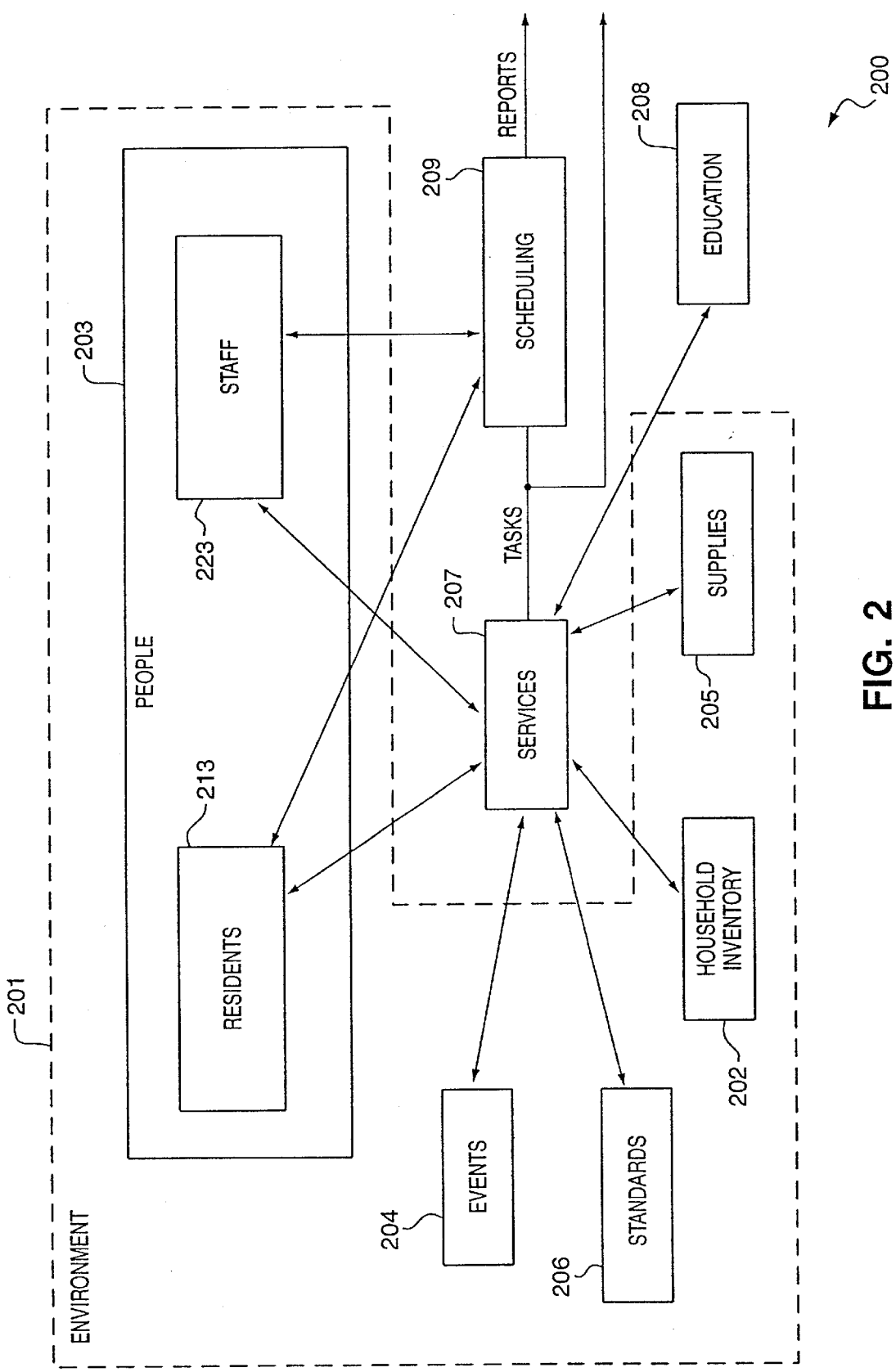
FIG. 2 illustrates in block diagram form the overall system architecture of the present facility management system, including the various operational modules incorporated therein.

FIG. 2 illustrates in block diagram form the overall system architecture of the present facility management system 200, including the various operational modules incorporated therein. There are numerous partitions of the facility management system 200 that can be implemented, and the present embodiment represents a preferred implementation of this system. The implementation details described herein are for the purpose of illustration of the concepts, and are not intended to limit the applicability of these concepts to other implementations of this system. For example, the facility described in this application is an estate household, although the present facility management system 200 can be used for a managed care facility, furnished temporary executive residence apartment, rehabilitation facility, or other facility where the resident's occupation is of sufficient duration and requires sufficient attention to detail to warrant the use of the facility management system.

The basic facility management system 200 is embodied as a database management system with the applicable report generation capability. The basic facility management modules comprise an Environment Module 201 that contains a plurality of components, each of which addresses a particular cross-section of the environment. For example, the Household Inventory Module 202 comprises a definition of the facility, its physical plant and contents. The People Module 203 comprises a definition of the various individuals that are impacted by the operation of the facility management system 200. The People Module 203 is subdivided into two components: Residents 213 and Staff 223. The Residents Component 213 comprises a definition of all of the residents, family members, visitors, guests while the Staff Component 223 comprises a definition of the staff, contractors, and the like. The attributes of each individual or company defined in the People Module 203 are cross-linked to other members identified in the People Module 203 and the various other Modules of the facility management system 200 as described below. The Events Module 204 comprises a definition of the various activities that occur in and about the facility. The Supplies Module 205 comprises a definition of the various consumables that are stored in the facility and used therein to provide the desired services and to maintain the facility. The Standards Module 206 comprises a characterization of the level of service provided for the various tasks that are defined by the facility management system. The Standards Module 206 is cross-linked to numerous other modules in the facility management system 200 to thereby define a level of service desired for each of the individuals identified in the Residents Component 213, for each of the events identified in the Events Module 204, as well as the level of maintenance provided for the facility, physical plant and contents defined in the Household Inventory Module 202.

Thus, the data input by a user to define the entirety of the environment is used by the second system module, the Services Module 207 of the facility management system 200, to create a set of data representative of the tasks that are required to be performed by the Staff to provide the services desired by the residents, to support the defined events and to maintain the facility. The defined tasks are then processed by a third basic module of the facility management system, the Scheduling Module 209, to create and output to the household manager a schedule of tasks on a per-staff member basis as well as to define the supplies required. The Supplies Module 205 can optionally include an inventory tracking and consumable exhaustion prediction capability to thereby automatically identify the supplies required and the time that these supplies would need to be replenished. In this regard, there is typically also included another basic module, termed the Education Module 208, that comprises a resource source that defines the particulars of the various levels of service that are selected by the user as well as instructional information that is available to facilitate the execution of the various defined tasks.

While the various modules noted above are characterized as discrete elements, in implementation they are typically data structures maintained in a relational database. The present characterizations are for the purpose of illustrating the multi-dimensional nature of the data cross-correlating and the complex nature of the couplings between the various data to provide a volume and granularity of information that is unavailable in known systems. This complexity and integration enables the facility management system 200 to define a level of service and degree of attention to detail that enables the staff to provide sophisticated and personalized service commensurate with the highest standards that are defined for household service (in this embodiment).

System Paradigm

A first step in the development of the service relationship between the staff and the residents is the creation of a baseline definition of the environment. This is accomplished by the use of a hierarchical multi-dimensional database structure, as shown in conceptual block diagram form in FIG. 3, that enables the user to populate each tier of the hierarchical multi-dimensional database structure with data relevant to that tier. In particular, the first tier of this module comprises a definition of the environment, which comprises the physical facility itself (Physical Property), its Geographic Location, the residents of the facility (People), Expenses, Analysis, and Other. These categories are illustrated in Table A below, and further exemplified by Details of each category and Examples of the type of data used to populate this database. This Table A demonstrates in a manner the exhaustive nature of the considerations that are processed by the present facility management system. In particular, the multi-dimensional nature of the database is evidenced in the various "views" of the facility that are provided on this first level, with the various major categories each comprising a separate, yet integrated set of information that must be considered in the management of the facility and the provision of the desired services.

TABLE A

| Item | Details | Examples |
|---|---|---|
| Geographic Location | Climate, Urban Access, Rural, Neighborhood, Surrounding Areas | Weather, hurricanes, floods, earthquakes, amount of precipitation, seasonality, near a city, shopping proximity, house style, residential, rural or commercial area, coastline, water proximity, mountains, desert |
| Physical Property | Structure, maintenance history, size, security needs, energy sources | Style, components, repairs, construction age, condition, square footage, property size, acreage, intrusion alarms, security gates, bodyguards, gas, electric, solar, sewage and drainage. gardens |

TABLE A-continued

| Item | Details | Examples |
| --- | --- | --- |
| People | Family, single/married/children number of guests, nationality, religion, personalities, current staff, contract vendors | Who is in the house, life styles, background, age, service perceptions, medical health, habits, ethics, relationships, expectations, life/work, experience, titles and attitudes |
| Other | Vehicles, pets, gardens, collectibles, extras, property information, additional buildings such as guests house | Cars, vans, recreational/sports equipment, dogs, cats, livestock, horses, vegetable gardens, orchards, pools, tennis courts, yachts, planes, antiques, vintage cars art collections, where smoking is permitted |
| Expenses | Household operating budget, maintenance budget, planned improvement, security, travel | Weekly/monthly budget, payroll, annual service, repairs, new construction, groceries, entertainment expenses |
| Analysis | Based on where the home is, the size of property, who lives there, their frame of reference regarding service and their life style, what style or kind of service are they expecting, and what are the hours of staff coverage being requested? | What are the household priorities? What is the expected management style, level and kind of management required in the household? What is the service style and kind of Household Manager and staff required to carry out the request? Is the type of housing provided, salary, benefits? |

The second tier of this database expands the tree of the database to a finer level of data granularity and comprises the next level of detail for a particular category. For the purpose of illustrating this concept, the Physical Property category is described herein, which second level is embodied in the Household Inventory Module of the present facility management system. The Level 1 data typically required for the Physical Property category is a technical description of the facility, such as address, legal description, and the like. The next successive granularity of detail is provided in Level 2 in terms of Zones contained in the facility, as shown in FIG. 4. This use of the Zone concept enables the user to define a volumetric segmentation of the facility into a plurality of juxtaposed segments that in combination define the totality of the facility. Each Zone represents a collection of rooms of the facility with their associated physical plant and contents. As can be seen from FIG. 4, each Zone typically comprises a plurality of rooms and/or passageways between rooms and/or adjacent outdoor areas. The selection of a locale for inclusion into a Zone is typically effected by the household manager and is based upon a number of factors, including but not limited to: community of interest (such as a plurality of bedrooms), physical proximity, served by a minimum number of staff members, requires common service/supplies, coordinated scheduling of service, pattern of activity of residents. Thus, for example, Zone 2 comprises a plurality of sleeping rooms and the adjoining hallways and stairs. The servicing of this Zone requires the repetitive execution of a set of tasks, thereby simplifying the provisioning of the staff who execute these tasks and avoiding the inefficiencies occasioned by the execution of unrelated services. The Zones are typically defined in terms of volumetric segments of the facility since the adjoining areas in a facility generally have similar or complementary functions. However, the term "volumetric segmentation" as used herein encompasses the inclusion of spatially disjunct areas or the residence in the Zone. For example, a studio over a garage may be serviced along with an office in the main building of the residence, even though these two areas are not adjoining, but the schedule of the residents and/or the type of services required may override the efficiencies provided by physical proximity. The residence is therefore divided into a plurality of Zones, each of which comprises a definition of a volumetric segment of the residence, whether or not comprising adjoining locales, with the sum of the Zones defining the entirety of the facility.

Figures 5, 6:
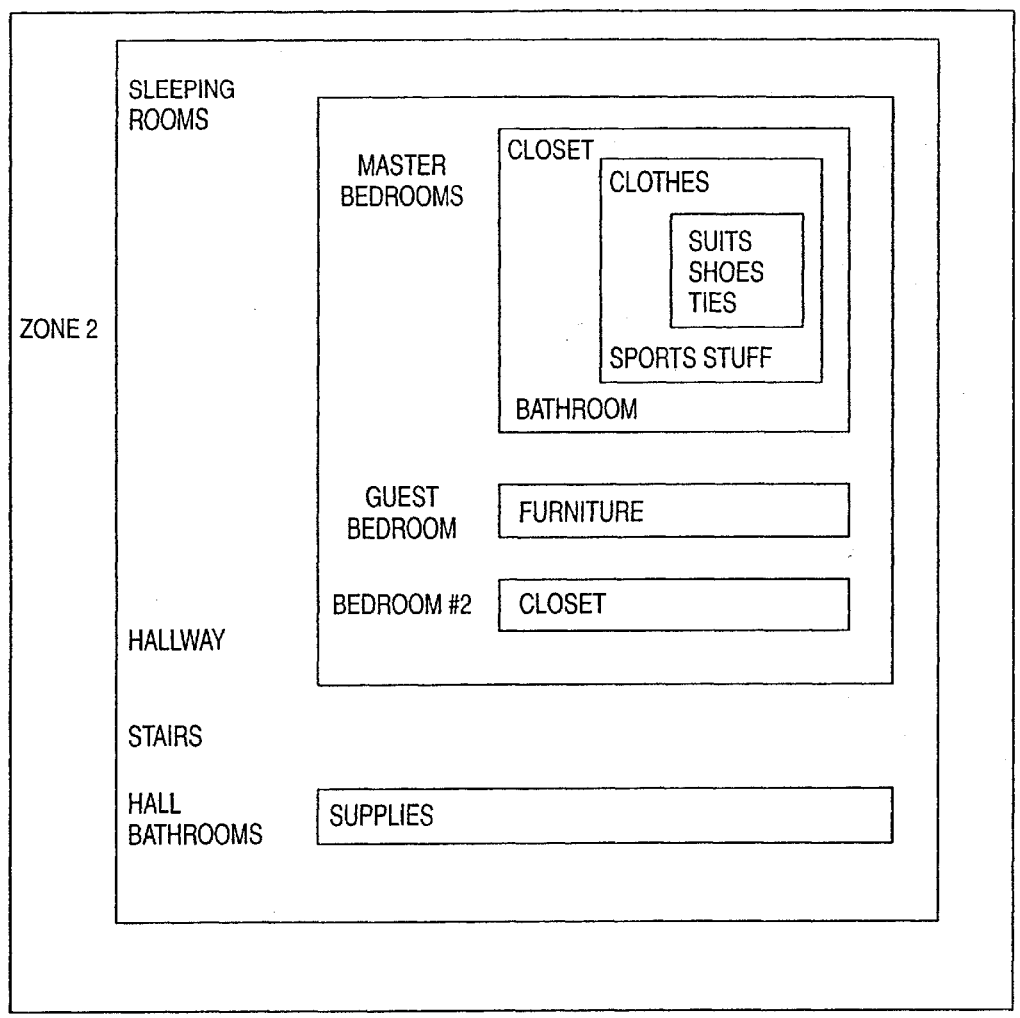
FIG. 5 illustrates in block diagram form an example of the hierarchical nature of database the present facility management system as embodied in the definition of a particular zone of the facility and its contents.
FIG. 6 illustrates a portion of the data entry displays of the present facility management system that defines a particular furnishing that is located in the facility.

FIG. 5 illustrates in block diagram form an example of one level of the hierarchical database of the present facility management system as embodied in the definition of a particular zone of the facility and its contents. In particular, Zone 2 is defined in Level 3 as comprising one or more Rooms and/or Hallways. As can be seen in the FIG. 3, the Zone 2 comprises Sleeping Rooms, Hallway 2, Stairs 2, and Hall Bathroom 1. Each of these entries itself is defined with further granularity. For example, Sleeping Rooms comprise: Master Bedroom, Guest Bedroom 1, Guest Bedroom 2. The Master Bedroom itself comprises: Furniture, Equipment, Bathroom, Closet. The Closet itself comprises a plurality of contents, such as: Clothes, Sports Equipment. Clothes comprise: suits, shoes, ties, pants, etc. Thus, the Household Inventory comprises a detailed inventory of not only the physical architecture and physical plant of the facility but also all of its contents, with a specific definition of all of the content specifics that are required to manage these contents and their use by both the staff and the residents. The present facility management system therefore enables the definition of the inventory in terms of the inventory comprises a description of the entity, a location of the entity in the household and any additional information relating to the entity that is necessary for its management and servicing.

DATA ENTRY EXAMPLE FOR A ZONE

FIG. 6 illustrates a portion of the data entry displays of the present facility management system that defines a particular furnishing that is located in the facility. The inventory is defined in terms of a Parent/Child relationship as selected by the user, and a simple example of the definition of the contents of a locale is illustrated in FIG. 6. In particular, the data entry screen provides a plurality of data fields into which the user inputs the data required to define the furnishing. A category field is provided to enable the item to be defined it terms of a user definable class, such as: furniture, paintings, china, appliances, clothes, and the like. The user can also input data relating to the object's "Cost," "Use," "Date of acquisition" and present location. The present location can either be on loan outside the facility, as noted by the "External Reference," "Off-Site," "Date Out," "Expected Return Date," and "Where Loaned" fields. Alternatively, the furnishing is located in the facility and can be located under "Blueprint ID" which defines a physical location of the object in the facility. The object can be further defined in terms of "Dimensions H W L" and the "Material Composition" which denotes special care instructions. Thus, the data input by a user relating to an object that is located within the facility provides sufficient information to the facility management system to enable the proper management of the object.

DATA ENTRY EXAMPLE FOR PEOPLE

FIG. 7 illustrates a portion of the data entry displays of the present facility management system that defines a particular resident of the facility while FIGS. 8A, 8B illustrate a portion of the data entry displays of the present facility management system that defines the preferences of a particular resident of the facility. These data entry fields enable the user to provide the information that reflects the subtleties necessary for the provision of personalized professional service. The data represents an exhaustive definition of the personal needs and desires of the residents and also integrates the management of the resident's medical and routine facility oriented financial needs, such as insurance, security, utilities and the like. The personal preferences section of the data input provides a temporal characteristic field for the resident's personal preferences, so that the temporal coordination of the services can be closely tied to the preferences and events.

Services Module

Once the environment is defined, the Services Module 207 analyzes the data that is stored in the Household Inventory Module 202 and the People Module 203 (with reference to the service level defined in the Standards Module 206) to produce a definition of the Task Reports that identify the multitude of work projects such as cleaning and maintenance schedules for the facility, including both the building and grounds. The Standards Module 206 identifiers a cooking style and favorite menus, clothing favorites and style of care, entertaining styles and favorites, style of security expected and schedules, style of transportation and schedules, child care expectations and favorites, elder care requirements and staff daily schedules "Day in the Life" duty roster. This entails both daily and weekly tasks and provides a mechanism to enable communication between the Household Manager and the Employer. It enables the Services Module 207 to define the daily pattern of activity of each staff member and thru the integration and correlation with the data stored in the various database modules of the system comprise a definition of a highly efficient and economical manner of operating the facility and providing the level of service custom defined for the particular residents of the facility.

Daily Graces

Daily Graces comprise the daily routine tasks that provide the underlying daily structure and set the level of service provided. These include such things as making the beds, feeding and walking pets, mail retrieval and processing, and the like. An example of the type of Daily Graces report that is produced by the scheduling module 209 of the facility management system is illustrated in both FIGS. 9 and 10. These typical reports comprise a definition of the task, its locale in the Zones, the time interval in which the task is to be performed as well as a data entry field to denote the completion of the defined task. This report when output, provides the Household Manager with a checklist to oversee the tasks of the staff on a broad perspective basis. The Daily Graces enable the completion of many tasks, some of which are easily overlooked. The use of the Daily Graces report enables the staff to address every task, to record the execution of these tasks and to update this list based upon daily activities to thereby operate the facility with an attention to detail unavailable without the use of the present facility management system.

FIGS. 11 and 12 illustrate typical output reports that can be produced by the present facility management system with regard to a particular zone (Zone 2 in FIG. 11) and with regard to the entire facility on a more global basis. Thus, the Zone 2 example show how the daily tasks are supplemented with a set of tasks that represent a level higher on the hierarchy of tasks. These "Weekly Cleaning" tasks are defined in terms of temporal trigger, completion notation and a characterization of the tasks on a Zone basis in general terms as well as an implementation specific notation that assists the staff in executing the task with the proper attention to detail. These weekly tasks represent periodic tasks that need to be scheduled on a regular basis but are not required to be performed daily. The use of the report of FIG. 11 enables all tasks to be addressed in due course without failure. In addition, a yet higher level set of tasks is defined in FIG. 12 which represents a facility-wide set of tasks that need to be scheduled on a regular basis but are not required to be performed daily or weekly. As with the list shown in FIG. 11, these tasks are to be addressed in due course without failure.

Ballet of Service

Ballet of Service comprises a component contained within the Events Module that defines the entertainment styles of the residents. The Ballet of Service provides a highly choreographed definition of the entertainment service that is desired by the residents and that is customized for the particular tastes of both the residents and their visitors and guests. The paradigm used is that of a theatrical production where the room is the stage, the visitors/guests are the audience, the props are the furnishings placed in the room, such as china, silverware, linen, etc, and the entertainers comprise the residents with a supporting cast of the staff. Without requiring the intimate involvement of the residents, the Ballet of Service addresses all of these factors in detail based upon the Household Inventory, Services, Personal Preferences as well as an embedded definition of a selected theme or variant of service that is programmed into the system.

The facility management system can implement a predictive system, since it has the capability to record the history of the facility and its operation, with the inclusion of feedback to identify the successes and failures in the provision of service. The facility management system can therefore correlate past events with planned activities to adaptively define the tasks based upon feedback. The predictive capability can be affected by the provision in the Services Module 207 of an element to provide the neuromorphic processing of data, such as an expert system, fuzzy logic, neural network. This predictive capability further enhances the utility of the facility management system.

Education Module

The facility management system 200 can optionally include an education or resource module 208 that provides a definition of the service to be performed. In particular, the variety of services and the diversity of manners of implementing these services represents a challenge to the Household Manager and the staff. There are numerous tasks that require special skills or must be executed in a manner that is unique to the facility. The teaching of these details to The staff is generally time consuming, difficult to ensure that The instructions are followed and error prone. The "institutionalization" of these task details is accomplished by The Education Module which contains a library of data relating to all aspects of facility management and The provision of services. For example, Appendix A attached hereto represents a small portion of this data relating to "Cleaning Tips and Responsibilities" that is available to The staff in The execution of these tasks. Other topics are embodied in The Education Module.

GUEST VISIT EXAMPLE

Figure 3:
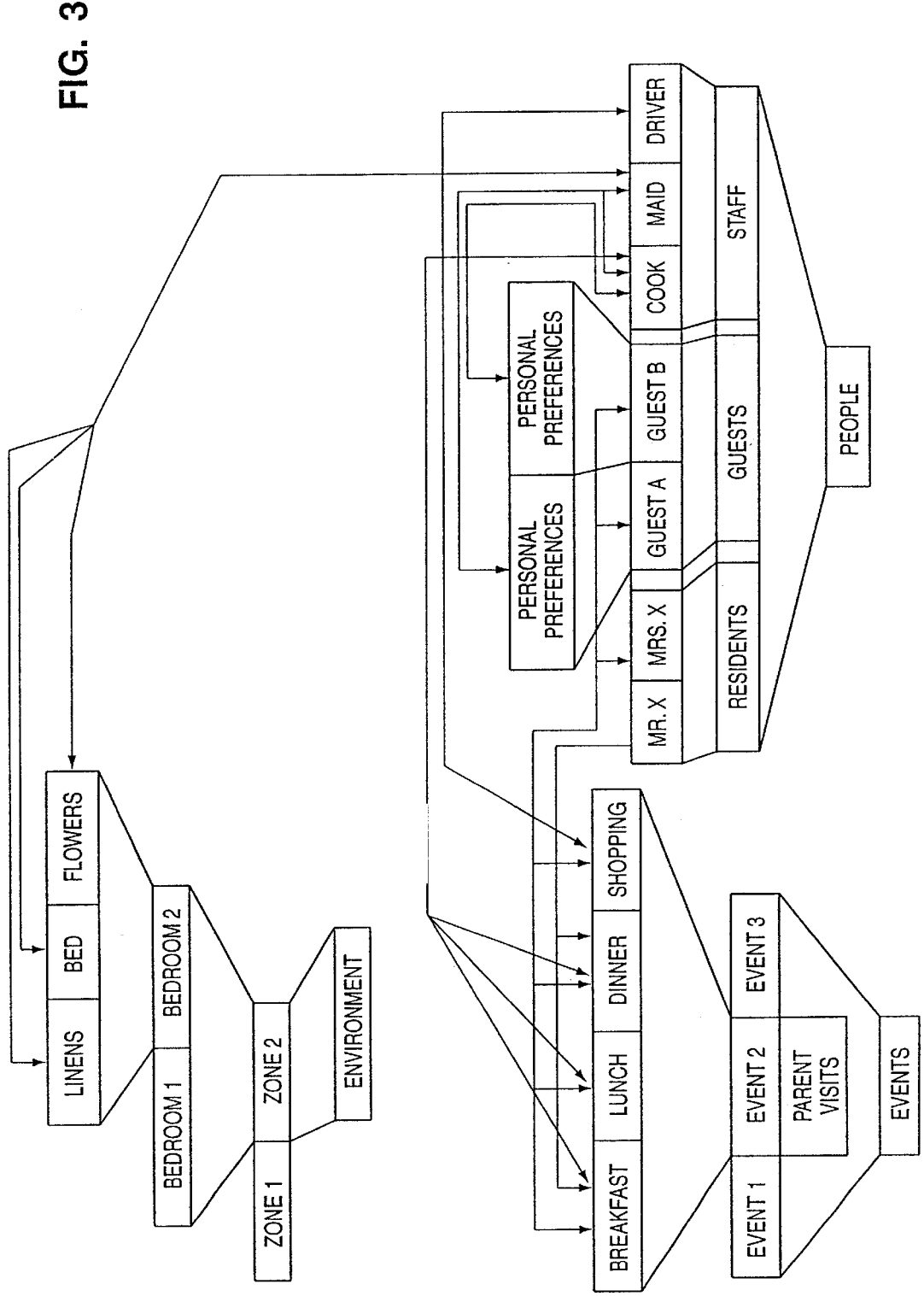
FIG. 3 illustrates in block diagram form the conceptual architecture of the multi-dimensional database of the present facility management system.

Returning to The conceptual diagram of FIG. 3, The example of a visit to The facility by The parents of one of The residents can be used to illustrate a partial view of The analyses and data cross-correlation that takes place in The facility management system 200. The visit is an "event" 204 and comprises a series of activities, such as breakfast, lunch, dinner, shopping trip. Each of The activities can be subdivided into a number of components, such as breakfast, which comprises a gathering of a number of guests and residents 213 (scheduling) and The provision of food: juices, coffee (type), hot food, cold food, fruits, bakery products. Each of these items is correlated with personal preferences and The schedule of The various participants. The personal preferences and food type must also be cross referenced with The supplies 205 to ensure that The preferences can be satisfied with The supplies on hand, or additional purchases can be made in time for The event. The food element itself must be cross-referenced with The cook and whomever purchases The supplies ("driver") to address The details of The materials needed to provide The desired service of breakfast. Furthermore, any specialty items on The agenda for breakfast can be cross-referenced with The education module 208 to provide data regarding The proper provision of The requested service. As noted above, The standards module 206 is linked to The various other modules to address The proper level of implementation of each of The services that are defined in The tasks output from The facility management system 200. For example, The breakfast can be casual on The patio, or formal in The dining room with china and crystal place settings, or some other configuration somewhere between these two degrees of formality. The services module 206 modulates The operation of The other modules in that it selects a certain defined measure of service expectation in terms of time and execution, and adjusts The selection of The output from each level of The other modules to correspond to The defined service expectation. The combination of these cross-referenced outputs is used to define and orchestrate The service delivery.

SUMMARY

The present facility management system implements a multi-dimensional relational database to support The service delivery functions within a facility as well as The management of The physical plant that comprises The facility. The linking among The various modules provided by The relational database enables The efficient definition of Tasks in terms of physical locale, timeliness, elimination of redundancy of operation, minimization of work effort, thereby rendering The effecting of these Tasks economical. Each of The modules of The present facility management system forges an information link with other information modules in The system and The data contained therein to address The key issues of Who, What, Where, When to thereby enable The definition of The Tasks.

What is claimed:

1. A system for managing the provision of facility management services by a service staff for a facility, comprising a plurality of rooms, that is occupied by at least one resident comprising:

room layout means for storing data that catalogues a physical layout, listing the plurality of rooms contained in said facility;

inventory means for storing data that catalogues contents of said rooms contained in said facility; and service definition means, responsive to said data that catalogues a physical layout listing the rooms contained in said facility, and said data that catalogues contents of said rooms contained in said facility, for defining a series of tasks to be performed by said service staff in said facility to maintain said rooms and said contents of said rooms.

2. The system of claim 1 further comprising:

scheduling means, responsive to said series of tasks to be performed by said service staff in said facility, for creating a schedule of execution of said tasks.

3. The system of claim 2 further comprising:

report generator means for generating reports listing at least one of: said series of tasks to be performed by said service staff in said facility and said schedule of execution of said tasks, on a calendar basis selected from: daily, weekly, monthly, annually.

4. The system of claim 1 further comprising:

execution means for defining particular details of execution of said tasks to facilitate the execution of the said tasks.

5. The system of claim 4 wherein said execution means comprises:

services level means for characterizing a plurality of levels of service, each of which specifically recites particulars of implementation of a defined service; and level selection means for selecting a one of said plurality of levels of service.

6. The system of claim 5 wherein said service definition means comprises:

database means for processing related data entries in said data that catalogues a physical layout listing the rooms contained in said facility, said data that catalogues contents of said rooms contained in said facility, and said tasks, as a function of said selected one of said plurality of levels of service.

7. The system of claim 1 wherein said room layout means comprises:

segmentation means for defining a segmentation of the facility into a plurality of juxtaposed volumetric segments that in combination substantially define the totality of the facility.

8. The system of claim 7 wherein said room layout means further comprises:

location definition means for defining a plurality of locales in each of said volumetric segments.

9. The system of claim 8 wherein said room layout means further comprises means for defining a plurality of elements, each of which is described in terms of a particular location within a locale within a volumetric segment.

10. The system of claim 1 wherein said service definition means comprises:

database means for defining each element of said contents of said facility in terms of a parent-child description of an element of said contents as well as a location in said plurality of rooms.

11. The system of claim 1 further comprising:
people catalog means for generating data comprising a definition of the various individuals that are impacted by the operation of the facility management system.

12. The system of claim 11 wherein said people catalog means comprises:
residents definition means for generating data that defines a plurality of members of the classes of: residents, family members, visitors, and guests of said facility, and their personal preferences; and
staff definition means for generating data that defines a plurality of members of the classes of: staff, and contractors of said facility, and their skills.

13. The system of claim 12 further comprising:
events means for generating data that defines various activities that occur in and about the facility.

14. The system of claim 12 further comprising:
personalization means for processing related data entries in said data that catalogues a physical layout listing the rooms contained in said facility, said data that catalogues contents of said rooms contained in said facility, and said data that defines a plurality of members of the classes of: residents, family members, visitors, and guests of said facility, and their personal preferences, to customize said tasks to reflect said personal preferences.

15. The system of claim 14 further comprising:
execution means for defining particular details of execution of said tasks to facilitate the execution of the said tasks.

16. The system of claim 15 wherein said execution means comprises:
services level means for characterizing a plurality of levels of service, each of which specifically recites particulars of implementation of a defined service; and
level selection means for selecting a one of said plurality of levels of service.

17. A method for managing the provision of facility management services by a service staff for a facility, comprising a plurality of rooms, that is occupied by at least one resident comprising:
storing room layout data that catalogues a physical layout, listing the plurality of rooms contained in said facility;
storing inventory data that catalogues contents of said rooms contained in said facility; and
defining, in response to said data that catalogues a physical layout listing the rooms contained in said facility, and said data that catalogues contents of said rooms contained in said facility, a series of tasks to be performed by said service staff in said facility to maintain said rooms and said contents of said rooms.

18. The method of claim 17 further comprising:
scheduling, in response to said series of tasks to be performed by said service staff in said facility, to create a schedule of execution of said tasks.

19. The method of claim 18 further comprising:
generating reports listing at least one of: said series of tasks to be performed by said service staff in said facility and said schedule of execution of said tasks, on a calendar basis selected from: daily, weekly, monthly, annually.

20. The method of claim 17 further comprising:
execution presentation for defining particular details of execution of said tasks to facilitate the execution of the said tasks.

21. The method of claim 20 wherein said execution presentation comprises:
characterizing a plurality of levels of service, each of which specifically recites particulars of implementation of a defined service; and
selecting a one of said plurality of levels of service.

22. The method of claim 21 wherein said characterizing a plurality of levels of service comprises:
processing, using a database, related data entries in said data that catalogues a physical layout listing the rooms contained in said facility, said data that catalogues contents of said rooms contained in said facility, and said tasks, as a function of said selected one of said plurality of levels of service.

23. The method of claim 17 wherein said step of storing room layout data comprises:
defining a segmentation of the facility into a plurality of juxtaposed volumetric segments that in combination substantially define the totality of the facility.

24. The method of claim 23 wherein said step of storing room layout data further comprises:
defining a plurality of locales in each of said volumetric segments.

25. The method of claim 24 wherein said step of storing room layout data further comprises
defining a plurality of elements, each of which is described in terms of a particular location within a locale within a volumetric segment.

26. The method of claim 17 wherein said step of defining comprises:
defining, using a database, each element of said contents of said facility in terms of a parent-child description of an element of said contents as well as a location in said plurality of rooms.

27. The method of claim 17 further comprising:
cataloging people by generating data comprising a definition of the various individuals that are impacted by the operation of the facility management system.

28. The method of claim 27 wherein said step of cataloging people comprises:
defining residents by generating data that defines a plurality of members of the classes of: residents, family members, visitors, and guests of said facility, and their personal preferences; and
defining staff by generating data that defines a plurality of members of the classes of: staff, and contractors of said facility, and their skills.

29. The method of claim 28 further comprising:
event defining for generating data that defines various activities that occur in and about the facility.

30. The method of claim 28 further comprising:
personalization for processing related data entries in said data that catalogues a physical layout listing the rooms contained in said facility, said data that catalogues contents of said rooms contained in said facility, and said data that defines a plurality of members of the classes of: residents, family members, visitors, and guests of said facility, and their personal preferences, to customize said tasks to reflect said personal preferences.

31. The method of claim 30 further comprising:
education presentation for defining particular details of execution of said tasks to facilitate the execution of the said tasks.

32. The method of claim 31 wherein said education presentation comprises:
characterizing a plurality of levels of service, each of which specifically recites particulars of implementation of a defined service; and
selecting a one of said plurality of levels of service.

* * * * *